Patented July 27, 1948

2,445,770

UNITED STATES PATENT OFFICE 2,445,770

BASIC IRON SOAP PIGMENT

Earl K. Fischer, Long Island City, N. Y., assignor to Interchemical Corporation, New York, N. Y., a corporation of Ohio No Drawing. Application April 10, 1942, Serial No. 438,442

3 Claims. (Cl. 260—414)

This invention relates to the brownish-yellow pigments obtainable from ferric hydroxides, and aims to provide a new pigment of this class, characterized by substantially complete transparency in oil, oleoresinous, resinous and cellulose derivative vehicles, with the production of a desirable golden color, and characterized chemically by being a hydrated ferric soap.

The ferric oxides and hydroxides have long been used as pigments. The naturally occurring oxides (hematites) have been used as red pigments, while the naturally occurring hydrated oxides (ochres) have been widely used because of their dirty golden yellow color. Ochres have been prepared artifically on a very large scale; even the fully hydrated ferric hydroxide has found some use as a pigment, although it lacks both the transparency desirable for some purposes, and the opacity necessary for other purposes.

I have discovered that substantially completely transparent golden yellow pigment colors, of excellent stability to light and other destructive agencies, can be prepared from iron salts. These new transparent pigment colors are ferric soaps of the general formula:

$$Fe(OH)_x R_y$$

where R is the radical of a soap-forming fatty acid, such as the higher fatty acids, resin acids and the like, and $x$ and $y$ may both vary from 1 to 2, with their sum 3. The soaps made from liquid fatty acids are ordinarily pasty liquids when dehydrated; where solid soap-forming acids are used, solid products result.

The usual dry color manufacturing procedures in which a precipitate of the hydrated soap is dried cannot be used because the particle size increases during the drying operation, and opacity rather than transparency results. Conventional methods for flushing and dehydrating a precipitate of the hydroxide, while not impossible, are difficult and costly, for the hydrous soap is strongly hydrophilic and does not readily transfer from the aqueous dispersion to dispersion of the colorant in suitable vehicles.

My invention also contemplates a method of making these compositions, in which the ferric salt is first reacted to the desired degree with an ammonium soap, and is then converted to the hydrated soap with ammonium hydroxide. The use of ammonium soaps and ammonium hydroxide produces soaps of maximum transparency because the reaction can be readily controlled.

After the pigment is precipitated, it is preferably washed, as by decantation, and heated while wet, preferably at a boil, with stirring. This heating is apparently necessary to cause completion of the reaction and hydration of the soap. The bulk of the water is removed by straining; the soap may then be passed over a mill if soft enough to produce a paste, or dried in an oven if hard.

Variants in the processing are numerous. For most purposes, a stiff paste is obtained after milling, which can be extended with other vehicles or solvents to give a fluid composition suitable for a variety of formulations. By the use of solid resins, a pulverulent powder dispersion is obtained.

For most purposes, ricinoleic acid is a desirable fatty component, because the base dispersions show high stability and freedom from skin formation. This fatty acid also is adopted for lacquer, synthetic resin, and other finishes.

Other soap-forming acids may be used. Oleic, stearic, dehydrated castor oil fatty acids (Isolene fatty acids), linseed oil fatty acids and other fatty acids may be used, as well as rosin and similar soap-forming acids. When a drying oil acid is used, however, it is necessary to carry all formulation operations to completion without allowing the base dispersion to remain exposed to air for any appreciable time. This precaution is not necessary for the ricinoleic acid product.

Resins, including especially those of the alkyd, phenol-aldehyde, and rosin ester gum classes, as well as natural resins and other synthetics, can be used in part as dispersion media where a pulverulent solid dispersion is desired. Diluents or solvents for the base dispersion include in general any material which acts as a solvent for the resin or fatty component. Included are xylene and other hydrocarbon solvents, pine oil, "Varnolene" (a petroleum fraction boiling between 150–210° C.), Cellosolve, butyl Cellosolve, etc. These solvents can be added most conveniently to the paste on the last pass on the roll mill, or by a separate mixing operation in a dough mixer or other suitable instrument.

Typical examples are the following:

*Example 1.—Castor fatty acid carriers*

Ferric chloride (hexa hydrate) \_\_\_\_grams\_\_ 2000
Water _____liters\_\_ 20

Stir to solution, heat to 60° C. Then add, over a ten-minute period, a soap solution prepared as follows:

| | |
|---|---|
| Ricinoleic acid (Baker's P-20)____grams__ | 750 |
| Ammonium hydroxide (28%)_____cc__ | 250 |
| Water, to make_____liters__ | 5 |

Follow the soap addition with—

| | |
|---|---|
| Ammonium hydroxide (28%)_____cc__ | 1380 |

Stir ten minutes.
Wash four times by decantation.
Heat for one hour at boiling temperature with stirring.
Strain through cheese cloth to separate the compact mass from the liquor. Milling on the three-roll mill gives a stiff base dispersion. Yield 1200 grams. This product can be reduced with other vehicles or solvents to obtain a fluid composition more readily incorporated into finished inks and coatings.

*Example 2.—Pine oil and castor carrier*

| | |
|---|---|
| Ferric chloride (hexa hydrate)____grams__ | 2160 |
| Water _____liters__ | 20 |

Soap solution, prepared as follows:

| | |
|---|---|
| Pine oil _____grams__ | 600 |
| Ricinoleic acid (Baker's P-20)_____do____ | 600 |
| Ammonium hydroxide (28%)_____cc__ | 400 |
| Water, to _____liters__ | 8 |

Add slowly to ferric chloride solution at 60° C. Add

| | |
|---|---|
| Ammonium hydroxide (28%)_____cc__ | 1200 |

Stir while heating until paste forms which is separable from water. Decant water. The yield is approximately 2000 grams of a paste containing 19% water, which can be dehydrated by milling.

*Example 3.—Pulverized dispersion*

| | |
|---|---|
| Ferric chloride (hexa hydrate)____grams__ | 216 |
| Water, to _____cc__ | 4000 |

Stir to solution at 60° C. Add slowly the following soap solution:

| | |
|---|---|
| Amberol 801 (rosin ester gum, hardened by reaction with maleic anhydride)___grams__ | 60 |
| Ricinoleic acid (Baker's P-20)_____do____ | 60 |
| Ammonium hydroxide (28%)_____cc__ | 40 |
| Water, to _____cc__ | 800 |

Heat Amberol 801 and ricinoleic acid to solution. Disperse by adding small amounts of ammonium hydroxide solution to form emulsion which finally inverts to oil-in-water type.
Stir, then add—

| | |
|---|---|
| Ammonium hydroxide _____cc__ | 200 |

Stir fifteen minutes. Wash three times by decantation or filtering and reslurrying.
Boil one hour. Filter or strain. Dry in oven at 60° C.
The resultant product may be pulverized, and represents a dispersion of the soap in a resin, which may be dissolved as needed in organic solvents.

Examples may of course be multiplied indefinitely without departing from the scope of the invention, which is defined in the claims. For example, the ferric chloride may be replaced by other ferric salts, or by ferrous salts oxidized to the ferric state before or during the pigment precipitation; and the soap-forming acids and carriers may be extensively substituted, as indicated.

I claim:

1. The method of preparing a transparent golden yellow film-forming composition which comprises precipitating a ferric salt with an ammonium soap to produce a ferric soap, and then converting the soap by heating with ammonium hydroxide to a hydroxylated soap of the general formula $Fe(OH)_xR_y$, where R is the radical of a soap-forming acid, and $x$ and $y$ each may vary from 1 to 2, with $x$ plus $y$ equal to 3.

2. The method of preparing a transparent golden yellow film-forming composition which comprises precipitating a ferric salt with an ammonium soap of a non-drying fatty acid to produce a ferric soap, and then converting the soap by boiling with ammonium hydroxide to a hydroxylated soap of the general formula $Fe(OH)_xR_y$, where R is the radical of a non-drying fatty soap-forming acid, and $x$ and $y$ each may vary from 1 to 2, with $x$ plus $y$ equal to 3.

3. The method of preparing a transparent golden yellow film-forming composition which comprises precipitating a ferric salt with an ammonium soap of ricinoleic acid to produce a ferric soap, and then converting the soap by boiling with ammonium hydroxide to a hydroxylated soap of the general formula $Fe(OH)_xR_y$, where R is the radical of ricinoleic acid, and $x$ and $y$ each may vary from 1 to 2, with $x$ plus $y$ equal to 3.

EARL K. FISCHER.

REFERENCES CITED

The following references are of record in the file of this patent:

UNITED STATES PATENTS

| Number | Name | Date |
|---|---|---|
| 221,072 | Krapp | Oct. 28, 1879 |
| 1,752,309 | Rosenbaum | Apr. 1, 1930 |
| 2,163,020 | Bodgan | June 20, 1939 |
| 2,169,577 | Bradley | Aug. 15, 1939 |
| 2,211,139 | Licata | Aug. 13, 1940 |
| 2,267,148 | Boner | Dec. 23, 1941 |
| 2,287,116 | Minich | June 23, 1942 |

FOREIGN PATENTS

| Number | Country | Date |
|---|---|---|
| 395,406 | Great Britain | July 17, 1933 |

OTHER REFERENCES

Chemical Abstracts, 24 : 4414 (1930).
Hackh's Chemical Dictionary, Ed. 2, 1937, page 112. Blakiston's Son & Co., Philadelphia, Pa.